United States Patent
King et al.

(10) Patent No.: US 6,934,098 B2
(45) Date of Patent: Aug. 23, 2005

(54) DATA CARD WITH A FULL CIRCULAR TRACK FOR ALIGNMENT AND AMPLITUDE CALIBRATION

(75) Inventors: Francis K. King, San Jose, CA (US); Jeffrey F. Liu, San Jose, CA (US); Shand-Ling Mao, Hacienda Heights, CA (US)

(73) Assignee: DCARD, Inc., Mulpitas, CA (US)

( * ) Notice: Subject to any disclaimer, the term of this patent is extended or adjusted under 35 U.S.C. 154(b) by 611 days.

(21) Appl. No.: 09/969,288

(22) Filed: Oct. 1, 2001

(65) Prior Publication Data

US 2002/0138808 A1 Sep. 26, 2002

Related U.S. Application Data

(63) Continuation-in-part of application No. 09/289,247, filed on Apr. 9, 1999, now Pat. No. 6,574,776.
(60) Provisional application No. 60/081,257, filed on Apr. 9, 1998.

(51) Int. Cl.$^7$ ............................................. G11B 25/04
(52) U.S. Cl. ............................... 360/2; 360/48; 360/101
(58) Field of Search ......................... 360/2, 77.03, 101, 360/48, 255.2; 235/449, 487, 484, 493

(56) References Cited

U.S. PATENT DOCUMENTS

| | | | | |
|---|---|---|---|---|
| 3,716,678 A | * | 2/1973 | Staar | 360/101 |
| 4,087,660 A | * | 5/1978 | Sedley | 235/449 |
| 4,114,181 A | * | 9/1978 | Itoh | 360/2 |
| 4,636,896 A | * | 1/1987 | Takikawa | 360/255.2 |
| 5,107,099 A | * | 4/1992 | Smith | 235/449 |
| 5,872,676 A | * | 2/1999 | Smith et al. | 360/77.03 |
| 6,016,959 A | * | 1/2000 | Kamo et al. | 235/449 |
| 6,250,552 B1 | * | 6/2001 | Hirasawa | 235/475 |

FOREIGN PATENT DOCUMENTS

| | | | | |
|---|---|---|---|---|
| JP | 63-76164 A | * | 4/1988 | |
| JP | 2-165478 A | * | 6/1990 | |

* cited by examiner

Primary Examiner—David Hudspeth
Assistant Examiner—Jason Olson
(74) Attorney, Agent, or Firm—Bo-In Lin

(57) ABSTRACT

This invention discloses a flat data storage medium that includes a plurality of substantially parallel data arc-segments. The data arcs further include at least one full circle data track provided for obtaining a measurement of an average amplitude of data signals over the full circle data track for calibrating a pickup head implemented for reading data from the data arc-segments. This invention further discloses a data storage system for accessing data stored in a data storage medium. The data storage system includes dynamic head loading/unloading system that includes a handle for pushing a linkage connected to the handle for loading and unloading the data storage medium to an engaged and disengaged positions relative to a pickup head for accessing data disposed on the data storage medium. The dynamic head loading/unloading system further includes a locking mechanism for automatically locking the data storage medium inside the data storage system when the linkage is disposed at an engaged-position. The dynamic head loading/unloading system further includes a data-storage medium orientation-selection for cooperating and adapting the data storage medium inside the data storage system only when the data storage medium is inserted into the data storage system in a predefined orientation.

29 Claims, 20 Drawing Sheets

| S Y N & A D M | S T I D X | E D I D X | G R A Y C O D E | A | | A | | | Data Track N+5 |
|---|---|---|---|---|---|---|---|---|---|
| | | | | | B B | | B B | | Data Track N+4 |
| | | | | A A | | A A | | | Data Track N+3 |
| | | | | | B B | | B B | | Data Track N+2 |
| | | | | A A | | A A | | | Data Track N+1 |
| | | | | | B B | | B B | | Data Track N |
| | | | | . | | A | | | |

DATA CARD WITH A FULL CIRCULAR TRACK FOR ALIGNMENT AND AMPLITUDE CALIBRATION

This Application is a Continuation-in-Part Application (CIP) of a previously filed Provisional Application No. 60/081,257 filed on Apr. 9, 1998 and a Formal application Ser. No. 09/289,427 filed on Apr. 9, 1999, now U.S. Pat. No. 6,574,776 by one of a common inventors of this Patent Application.

BACKGROUND OF THE INVENTION

1. Field of the Invention

This invention relates generally to systems and method for reading data from and writing data to data storage medium by employing the magnetic or optical recording technology. More particularly, this invention is related to a data card provided with at least one full circle data track among a group of data arc segments for card position alignment and signal amplitude calibration.

2. Description of the Prior Art

For a data card formed with multiple data arc segments, there is a need to determine the central axis of the data card to precisely position the data card for reading and writing data. As the data card has multiple arc segments, a more complex algorithm must be applied using a set of data obtained by reading data from multiple arc segments for the purpose of determining a central axis. The process is less efficient and may be time consuming thus preventing the operations of reading data from or writing data to the data card in a timely manner. In addition to the need to determine the central axis of the data card, it is also required to calibrate the data signals read from the data arcs because there are variations between different cards. For such calibration, an average-amplitude of the data signals as a magnetic or optical pickup head scan over the data arcs must be calculated. The average signal amplitude determined from measurements of multiple data points are generally required for such determination. Again, for a data card that has multiple data arcs, such calibration process may required data signals from multiple data arcs and thus would be less efficient and taking up longer times and slowing down the initialization of data reading and writing operations. Due to these reasons, less efficient operation and slower initialization may often be encountered when regular data card formed with multiple parallel data arcs are implemented.

The rotational head data recording and retrieving system as that disclosed in a co-pending Patent Application is implemented to resolve the difficulties of the conventional technology. Specifically, in conventional data storage systems, the reading and writing of data are performed on concentric circular data tracks. The concentric data track configuration often presents a problem that the data-bit density varies between the outer tracks and the inner tracks. The variable bit density in data storage is due to a geometrical factor that the outer data tracks are much longer in length than the inner tracks. A common practice is to form the inner tracks with a capacity to store the data bit at a higher bit density. A more complicate servo control system implemented with more complex signal-processing algorithms is required due to the variations of data storage density between different data tracks. Additionally, by varying the data storage density from the inner tracks toward the outside tracks, the data transfer rate is also changed in accessing data from the inner tracks then outside tracks. Such variation may also cause difficulties and complications in processing the data. Higher error rates may incur due to these variations between the inner tracks and the outer tracks.

There have been designs using pickup head with oscillating arm to prescribe multiple parallel data arcs at a flat data media and a constant data recording density for easier data access arrangement. There are also designs to use single or multiple rotating head pairs to prescribe multiple data arc segments on a circular track and/or on such multiple parallel track arrangements. All such designs required either pickup head with oscillating arm or head pairs configuration. All prior art designs also require that the flat media to be statically positioned to signal pickup heads once the flat media is engaged or inserted to the device.

An invention implemented with a rotational-head for data recording and retrieving as that disclosed in a co-pending Patent Application is able to resolve the above described difficulties of uneven data storage densities. However, the inefficiency and complexities of the operations to position the card and to calibrate the signal amplitude still present as technical difficulties to those of ordinary skill in the art yet to be resolved.

Therefore, a need still exists for an improved data-card operated with new configuration and method to overcome the technical difficulties as described above. Specifically, the storage card drive system shall provide a uniform density for data storage. Also, the data card should also provide a data tack configuration to conveniently determine a central axis of the data card and to measure the average signal amplitude for signal calibration. Furthermore, it would be desirable to keep the system portable and be provided with several standardized sizes for processing standardized data-storage cards.

SUMMARY OF THE PRESENT INVENTION

Therefore, an object of the present invention is to provide a data storage-card drive system with single pickup head moving above the data-storage card in rotational movement. The data read-write functions are enabled only for arc-segments of the rotational movement guided by servo data written to servo sectors on the data arc with proper offsets. Also, the data tracks are arranged as plurality of parallel arcs, e.g., half-circles. At least one special full circle data track is provided for conveniently determining a central axis of the data card and for obtaining a measurement of average amplitude such that the above mentioned difficulties and limitations encountered in a regular data card can be overcome.

Specifically, it is an object of the present invention to provide a data-storage card drive system with single pickup head driven by a motor, e.g., a brushless motor, to rotate over the data-storage card with the rotation axis perpendicular to the card surface. The motor is mounted on a carriage for making horizontal movement along a longitudinal direction of the data card. An X-Y table is provided to move and position the card on the center relative to the rotation of the pickup head. The data card is formed with at least one full circle data track for conveniently centering the data card and to obtain average signal amplitude for calibrating the amplitude of the signal read from the data card. The present invention also provides a solution to dynamically engage the flat media and signal pickup head.

Another object of the present invention is to provide a data-storage card drive system for performing the data access tasks over a data storage medium surface, which has uniform data storage density. A new configuration of data-tracks formed as parallel arc or arc-segments, e.g., semicircular data track, is implemented such that all data tracks have substantially the same length for data storage and the data bits are stored with uniform density. In the meantime, at least one full circle data track is formed on the data card for enabling efficient operations of positioning the data card and obtaining a measurement of average signal amplitude for signal calibration.

Briefly, in a preferred embodiment, the present invention discloses a data card that has a plurality of substantially parallel data arcs disposed on a flat data storage medium. The data arcs further include at least one full circle data track provided with data for conveniently determining a central position of the data card in a data drive system. The data stored in the full circle data track can also be conveniently used to obtain a measurement of average signal amplitude to calibrate the signal measurements from the data card.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1A:
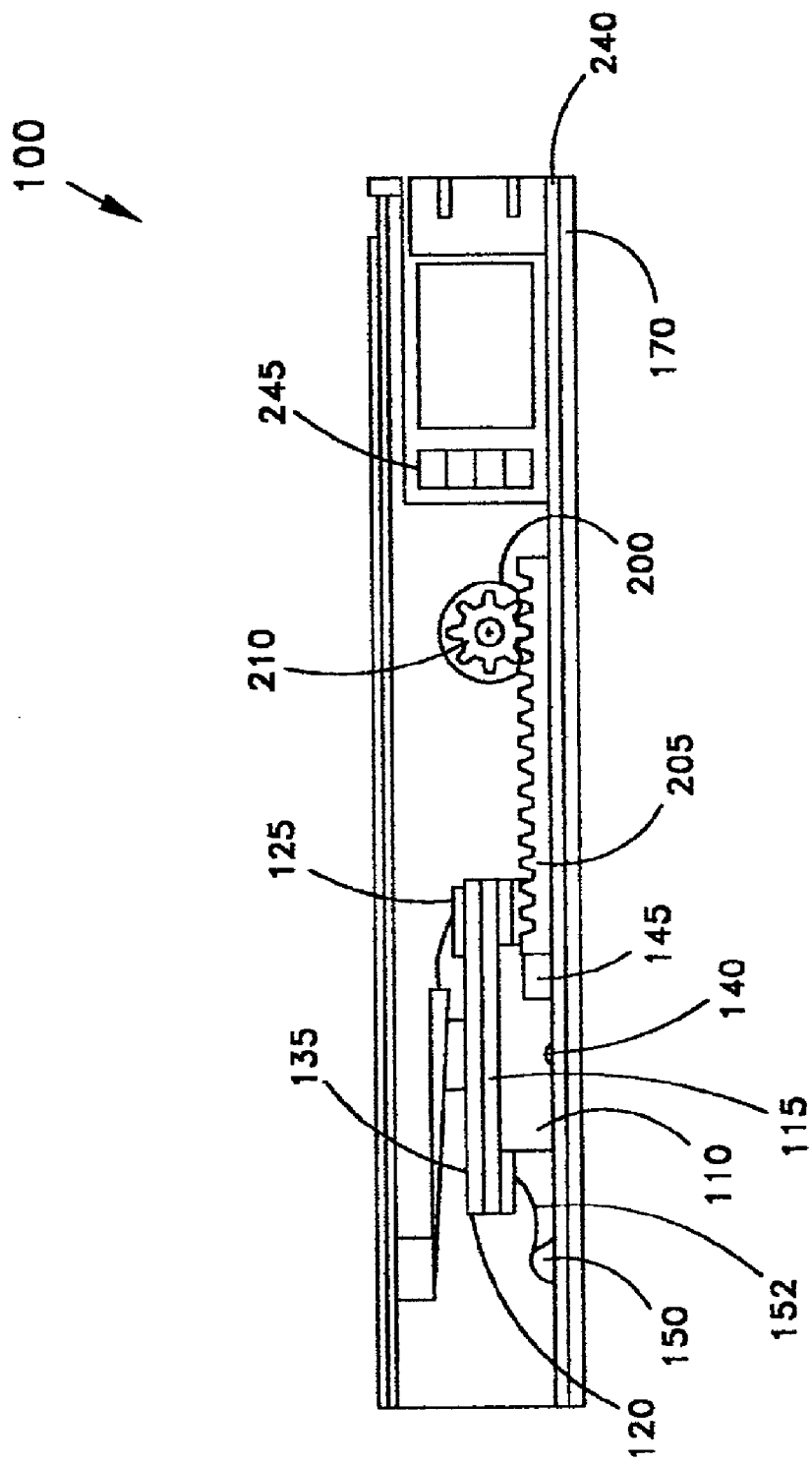
FIGS. 1A and 1B shows a cross sectional view and a top view respectively of a data card drive system of this invention.
Figure 1B:
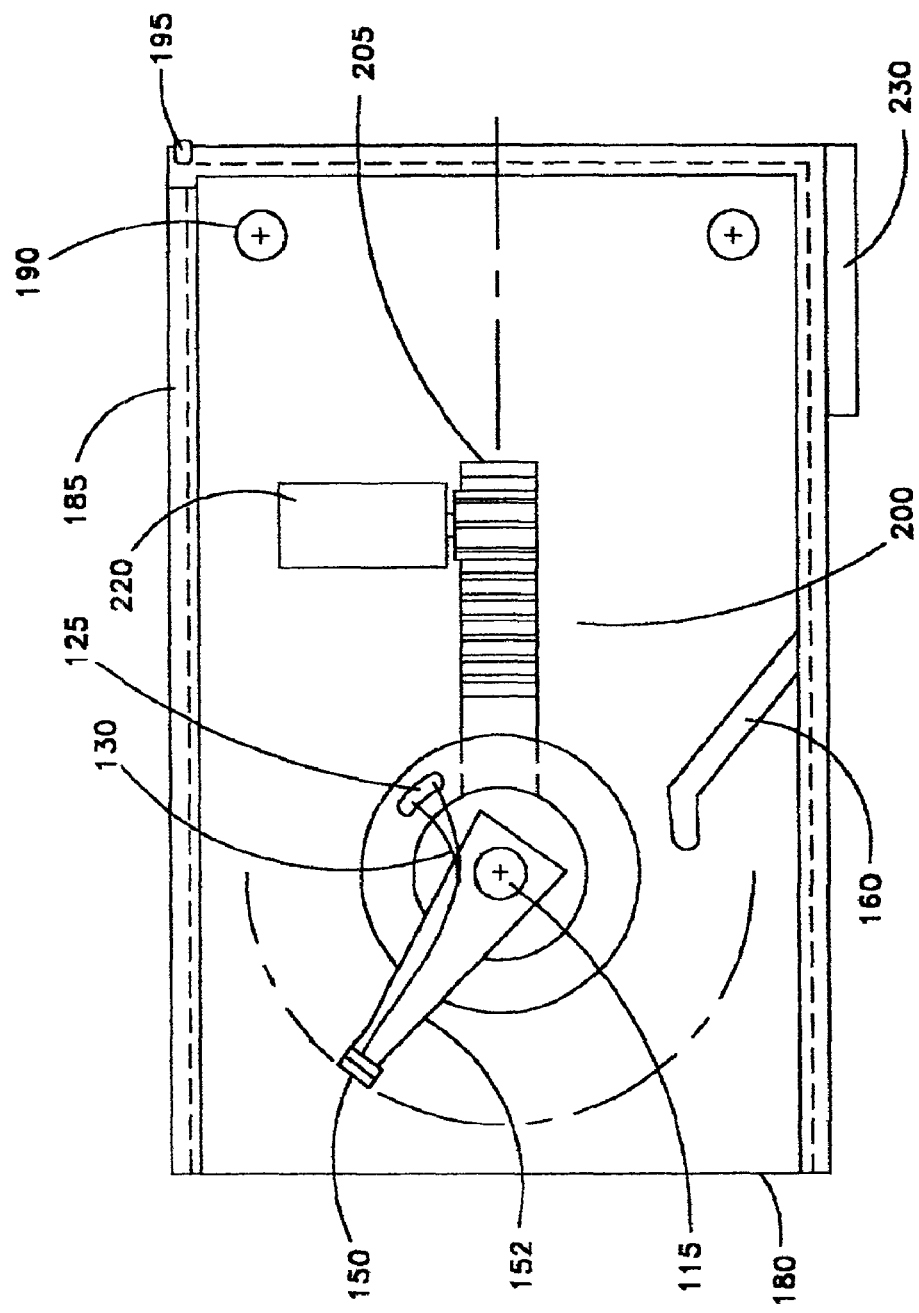

FIGS. 1A and 1B show a cross sectional view and a top view respectively of a data-card drive 100 of the present invention. The data-card drive 100 can be configured for reading and writing data-cards of different sizes, e.g., a PCMCIA type card or common credit card size. The data-card can also be of different shapes such as a square, a rectangular, a circular disk, or a card with straight and parabolic edges or different types of arc-edges. The data-card drive 100 includes a motor 110, e.g., a DC brushless motor. The motor 110 is provided to operate at a low speed to conserve battery power, at high speeds to achieve fast data access time. The motor 110 is further provided to function at two different modes, i.e., a sleep mode when not being deployed, and a wake up mode for normal data access operations. The motor 110 is mounted on a carriage 115 with a pickup head assembly mounted to the motor rotating shaft assembly. Half of a magnetic transformer, 120-1 which can either being a ring type, a round-disk type, or other geometrical shapes, is mounted onto the motor rotating shaft assembly, the other half of the magnetic transformer 120-2 of similar configuration is mounted to the fixed part of motor assembly. Signal wires 130 form head are soldered onto the rotating half of the transformer 120-1 with the soldering pad 125, that can also be a spring pressed connection, for transmitting the read/write signals via the magnetic transformer 120. The magnetic transformer 120-1 and the soldering pad 125 are covered by a magnetic flux shield plate 135 for shielding the magnetic flux generated by the magnetic transformer to prevent DC erase of data. A ground spring 140 is applied to perform the function of dissipating electric static discharges. Optionally, a brake-magnet 145 is provided to fix the "parking" position of the motor 110 in the sleep or power off mode during the time when there is no data access activities.

A read/write head 150 is mounted via an extended head-arm 152 to the brushless motor 110 via a head-arm mounting assembly mounting holes 155 to the head carriage 115. A head loading/unloading arm 160 is mounted on the base-plate 170. The loading/unloading arm 160 presses to the head-arm 152 at the unload position at a drive-device power-off mode. The loading/unloading arm 160 is removed from the head-arm 152 when a data card 180 is loaded and the power for the drive device is turned on.

In order to assist a smooth loading of the data card 180 into the drive device 100, a card guide plate 185 is provided. The data-card drive system 100 further includes one or several data card pins 190 to engage and fix the position of the data card 180 when the data card 180 reaches a designated operational position. The data card pins 190 increases the compatibility and interchangeability of different types of data cards for data access operations using this data card drive system 100. The drive system 100 further includes an on/off switch 195, which is turned on when the data card 180 reaches its final position.

Figure 1C:
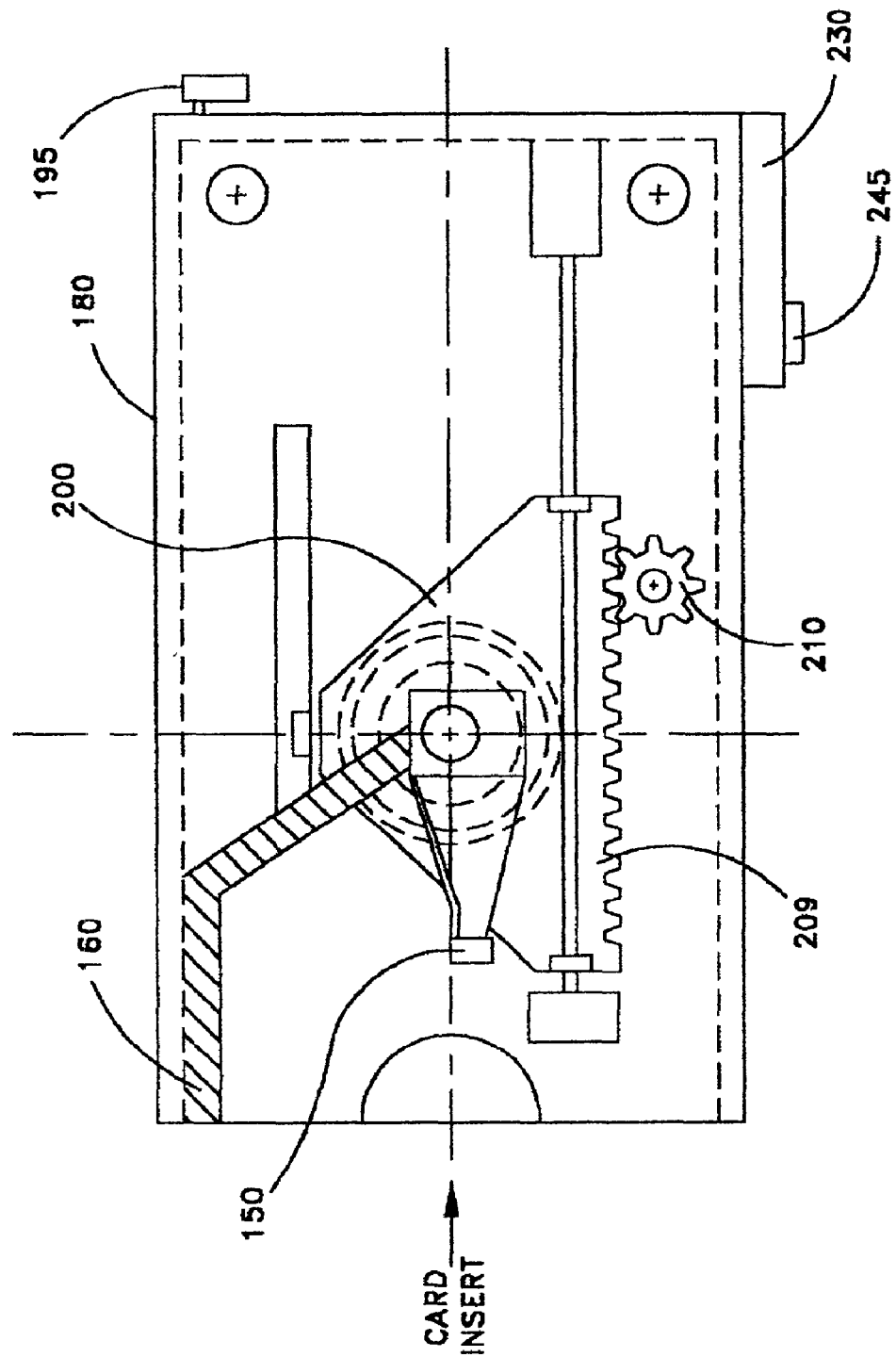
FIGS. 1C and 1D are cross sectional views for showing the details of the motor rack mounting and the head loading/unloading assembly.
Figure 1D:
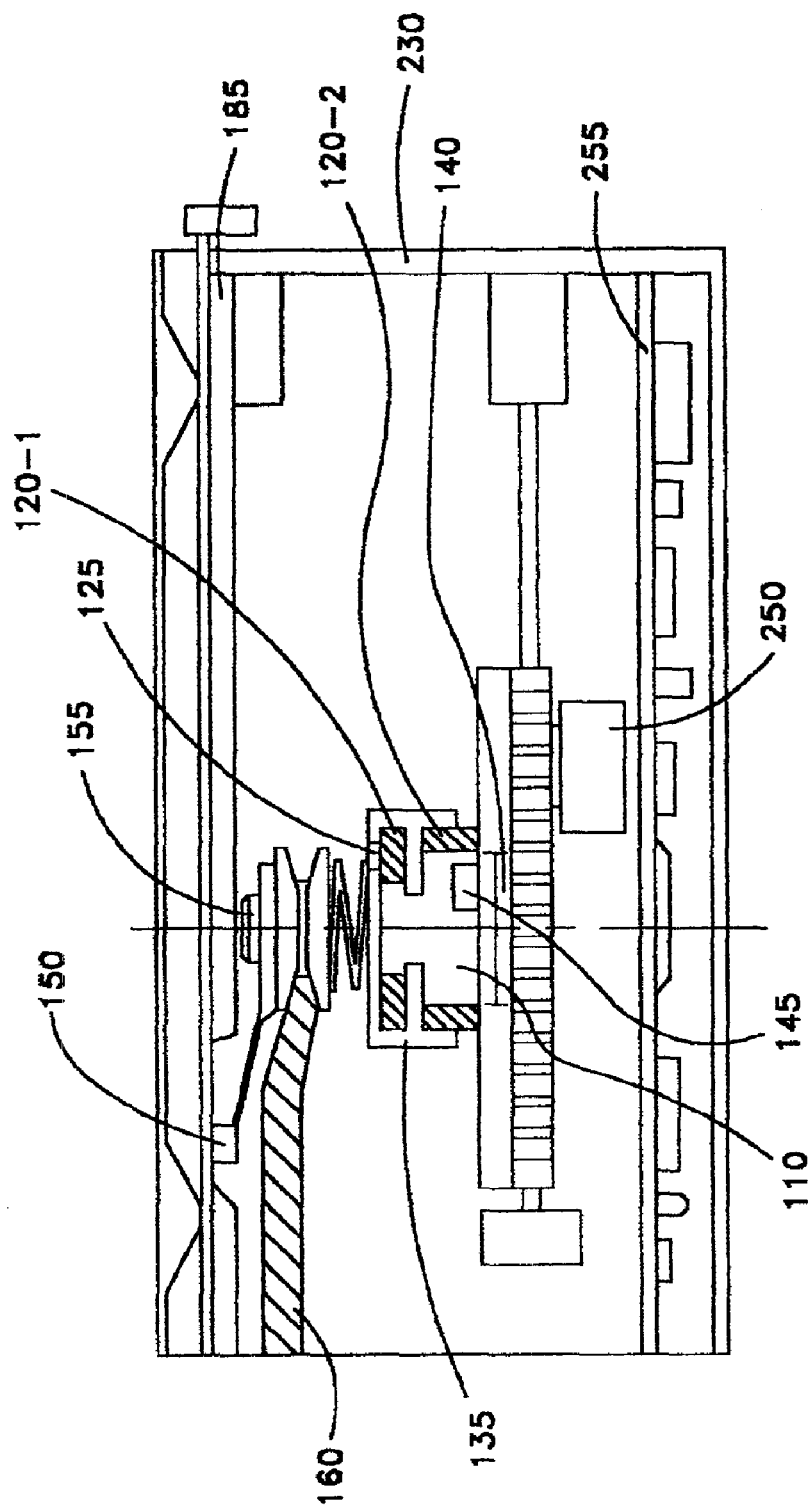

The brushless motor 110 is mounted onto a motor-rack mount 200 with a rack 205 and a pinion 210. A step motor 220 is employed to control the linear movement of the motor 110 or the movement of the data card 180. The drive device 100 further includes a LCD display 230 to indicate the track position of the head 150 in reading or writing of data onto the data card 180. Mounted on the base plate 170 is a printed circuit board 240, which supports a track locator switch 245. The printed circuit board 240 further supports various kinds of circuits for performing the functions of control and data access. These circuits includes head tracking circuit 250, IC preamplifier 255, head loading/unloading circuits, disable/enable read-write function circuit, servo control integrated circuit (IC), motor control IC, data separator IC, ADI interface IC, USB interface IC, PCMCIA interface IC, USB connector, PCMCIA connector, and other circuits required for controlling and operating the data card drive system. FIGS. 1C and 1D are cross sectional views for showing the details of the rack 205, the pinion 210, and the head loading and unloading assembly 160 to lift the head when the drive device 100 is turned off. A head arm lifter 103 has a wire type hook 103A positioned above the pickup head arm 152. The sliding of the head arm lifter 103 with the wire type hook 103A along the motor shaft assembly can lift or lower the pickup head arm 152 and in turn lift or lower the pickup head 150. The pickup head arm 152 is rotating with the motor shaft and the pickup head 150. Regardless of where the pickup head 150 when the rotational movement stops, the arm 152 can always engage into the head lifter 103 slot and sliding the head lifter 103 along the motor shaft.

The drive device 100 as described above is also provided with an option to perform the functions of a servo writer. A novel servo writer is disclosed in this invention which can be manufactured with simplified manufacturing processes. The servo writer includes a storage card loading assembly that is structured similarly to a card guide 185 of the device 100. The storage card can be inserted horizontally inserted for direct contact with the pickup head 150. Or, depending on specific application, the data storage card can be inserted from a vertical slot opening and then flip over for contact with the pickup head. In writing the servo data, the pickup head 150 is rotating along different data tracks. The pickup head is moved to different tracks during the operation of writing servo data by either moving the head/motor assembly mounted on the shaft or by keeping the head/motor assembly stationary while horizontally moving the data storage card. The magnetic transformer is employed in writing the servo data onto different data tracks where the cables are arranged without being twisted when the pickup head is making rotational movement.

Figure 1E:
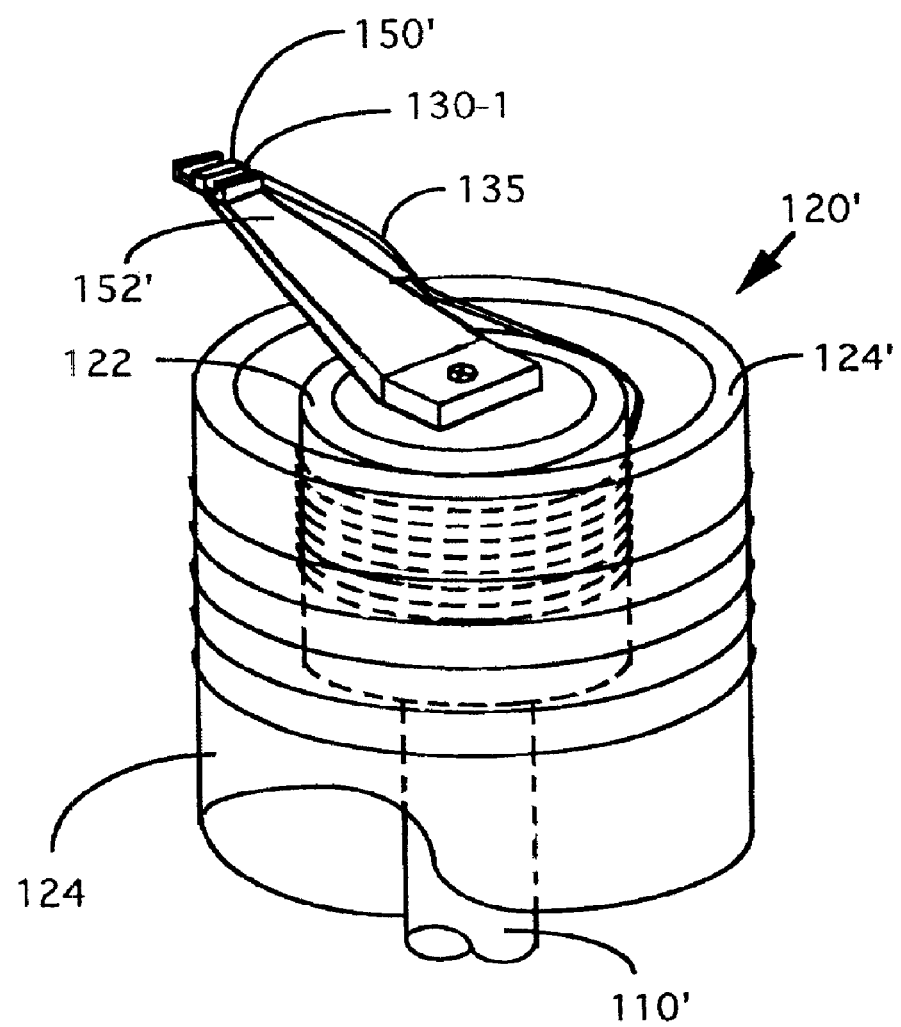
FIG. 1E shows a perspective view of the pickup head and the wires winding configuration serving as read/write data signal transformer.
Figures 1F, 1G:
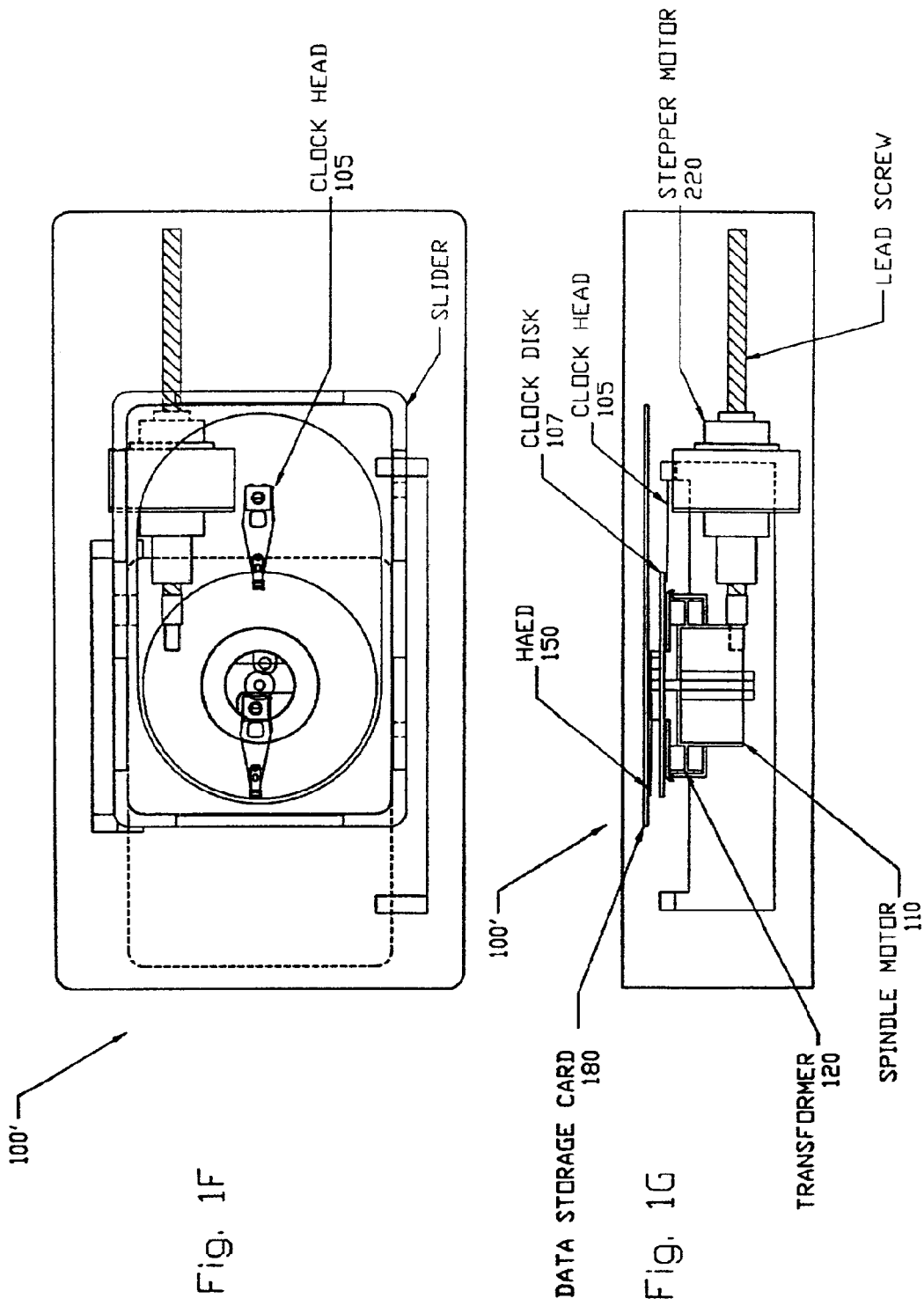
FIGS. 1F and 1G show the top view and cross sectional view respectively of a magnetic or optical servo writer of this invention.

FIGS. 1F and 1G are a top view and a cross sectional view of a preferred embodiment of a data-card servo writer system 100', which has a clock head 105 connected to a clock disk 107. The clock disk 107 is disposed below the magnetic or optical data card 180 and de-coupled from the data card 180. The motor drives the pickup head 150 also drives the clock disk 107. The clock disk can be rotated while the clock head 105 is fixed and stationary and mounted on the frame assembly of the servo writer system 100'. The clock head 105 is employed to write clock signals, e.g., a binary bit 1 for the whole cycle. All of the data bits on the entire data track of the clock track are binary bit "1". Then, a pulse is stopped to write a binary bit "0" to provide that "0" as index while using all the bit "1" for timing to format the card. Read and write signals of the clock head 105 is transmitted through wires to the clock disk 107 formed on a printed circuit board. The clock head 105 is employed to write the clock signals onto the magnetic or optical clock disk and to read back the signals. The clock signals read back from the magnetic or optical clock disk are used as timing signals to format the card to include the servo patterns to be further described below. Once the magnetic or optical data-card 180 is formatted by the servo-writer system 100', it is ready for data read/write operations by applying a regular magnetic or optical data-card drive system as that shown in FIGS. 1A to 1E. The formatted sectors on the magnetic or optical data-card 180 are also write-protected to prevent incidental writing over these segments.

According to FIGS. 1A, 1B, 1C and 1D and above descriptions, the present invention discloses a data-card drive system 100 the present invention includes a magnetic or optical data-card drive system. The drive system includes a magnetic or optical pickup head for rotationally moving over and accessing data stored in the magnetic or optical data card. In a preferred embodiment, the magnetic or optical pickup head is provided for reading data from and writing data to the magnetic or optical data card. In another preferred embodiment, the magnetic or optical pickup head is provided for accessing data over substantially one-half of the rotational movement. In another preferred embodiment, the magnetic or optical pickup head is provided for accessing data over several arc-segments during the rotational movement. In another preferred embodiment, the magnetic or optical pickup head is provided for rotating in a single rotational direction. In another preferred embodiment, the magnetic or optical pickup head is provided for rotating in clockwise and counterclockwise directions. In another preferred embodiment, the magnetic or optical pickup head is provided for rotating over arc segment having radius smaller than half-width of the magnetic or optical data card. In another preferred embodiment, the magnetic or optical pickup head is provided for rotating over an arc segment having a radius greater than half-width of the magnetic or optical data card. In another preferred embodiment, the magnetic or optical pickup head is provided as a removable and replaceable module. In another preferred embodiment, the magnetic or optical pickup head is provided for accessing data by contacting the magnetic or optical data card. In another preferred embodiment, the magnetic or optical pickup head is provided for accessing data by rotating at a distance above the magnetic or optical data card. In another preferred embodiment, the magnetic or optical data-card drive system of further includes a motor that has a rotating shaft for mounting and rotating the magnetic or optical pickup head. In another preferred embodiment, the magnetic or optical pickup head further includes a data signal transformer for transforming a data signal through data signal induced changes of magnetic flux.

FIG. 1E is a perspective view of an alternate configuration of a data signal transformer 120'. The data signal wires 130-1 connected to the pickup head 150' supported on the arm 152' for the pickup head 150' are first winding around an inner signal transforming cylinder 122', which rotates with the rotation shaft or the motor 110'. A stationary hollow pipe 124' is placed around the inner signal-transforming cylinder 122'. A set of signal transforming wires wrap around this stationary hollow pipe 124'. For read/write data, an electric signal representing a binary bit can be transferred from a pickup head 150' through the wires 135' to the wires wrapping around the inner signal-transforming cylinder 122'. The electric signals, typically an electric pulse, transferred to the wires around the inner cylinder 122' can be detected with variations of electromagnetic field by a set of wires wrapping around the stationary hollow pipe 124'. Similarly, the data signal for the pickup head 150' can also be provided to the wires wrapping around the stationary hollow pipe 124' as electric pulses and detected by the wires wrapping around the inner signal transforming cylinder 122' for transfer to the pickup head 150'. The wires around the inner and outer cylindrical pipes function as inductive coils serving the function of data signal transformation.

Figure 2A:
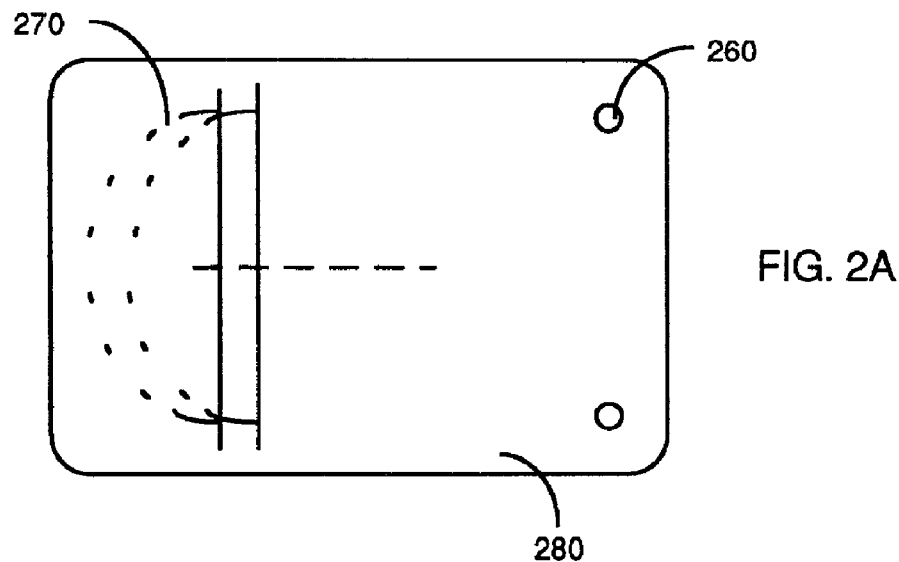
FIGS. 2A to 2C are respectively a top view, a cross sectional view and a bottom view of a data storage card with data tracks formed for storing bits with uniform density in each of these data tracks.
Figure 2B:
Figure 2C:
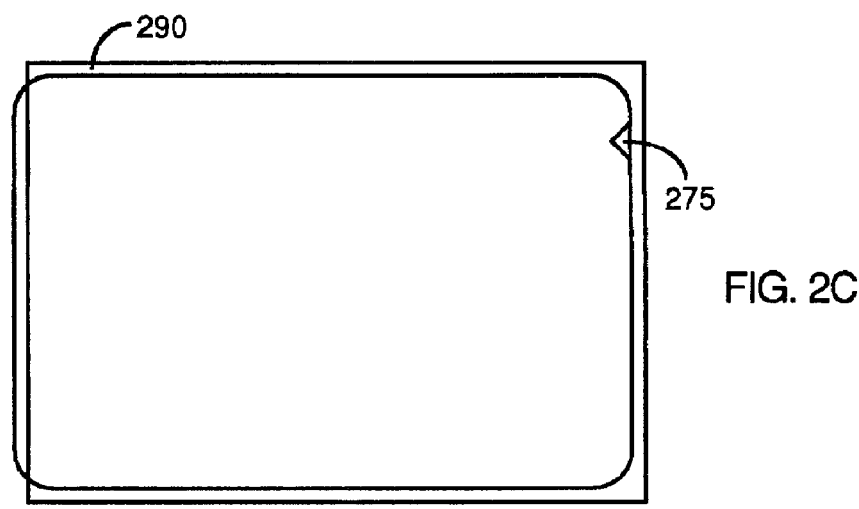

FIGS. 2A to 2C are respectively a top view, a cross sectional view, and a bottom view of a data card 180 of the present invention. The data card 180 is formed on a substrate plate 250. The substrate-plate 250 for magnetic recording is composed of non-magnetizable materials with a flat surface, e.g., a plastic or glass substrate plate. For magnetic recording, a magnetizable material can also be employed to form the substrate plate 250. The substrate plate 250 is then coated with a thin layer of recording medium on one side or both sides. For magnetic recording, the coating are formed by magnetic particles coated on one-side or both sides of the substrate plate 250. The magnetic coating can be directly on the surface of the substrate plate 250 or on a Mylar type of material with adhesive layer for attaching to the substrate plate 250. For magnetic recording the recording medium layer can be formed by a process similar to that of a magnetic compact-disk (CD), CDR, LD, or digital video display (DVD) disks. The data card 180 can be formed with standardized sizes, e.g., PCMCIA standard sizes or standard credit card sizes, and has round or elongated holes 260 for fixing the card at pre-designated positions to initialize a data access operation. The holes 260 are fitted to the pins 190 to provide the self-centering and locking functions. The data storage card 280 can therefore be repeatedly placed at a pre-designated position with reliable accuracy. The data card 180 is provided with a plurality of data tracks 270 for storing data bit on each track. Each of these data tracks is formed as substantially an arc or arc-segments track. The data tracks 270 are substantially of a same length and are substantially parallel to each other. The data tracks 270 are formatted to include multiple sectors. One or several of these sectors can be flexibly employed to provide servo data for the purpose of identifying track locations to enhance sector seeking during a data-access operation. The servo-data are provided in sectors near both ends of the arc or arc-segments data tracks 270 as shown in FIG. 2A. For the purpose of more precisely positioning the data card 180 in a drive device, a notch 275 is formed near the inner end of the data card 180. With the notch 275, the data card 180 is more conveniently placed into the drive device fitted to the initial card position ready for operation relative to the position of the pickup head 150. The data card 180 is then covered by a protective coating 280 preventing damages from exposure to water, dust and other foreign particles introduced through the daily operational environment. The data card 180 is then stored in a data card envelop 290 for storage and shipment. The data storage tracks of the data card may contain user application and system configuration data. The recorded data can be updated in the field. Application system can either encrypt or decrypt the recorded data. Application system can also change the configuration such as set and reset the write protection, the password and other features related to the data-access operations.

Figure 2D:
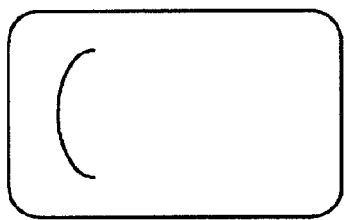
FIG. 2D to 2Q show the top views of the data storage card of this invention where the data tracks can be arranged in arc-segments of different shapes, sizes, and facing different directions.
Figure 2E:
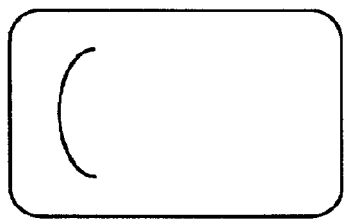
Figure 2F:
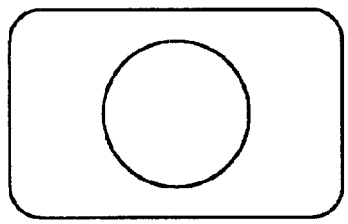
Figure 2G:
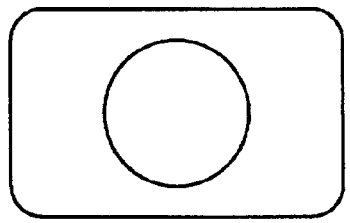
Figure 2H:
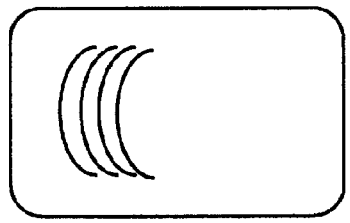
Figure 2I:
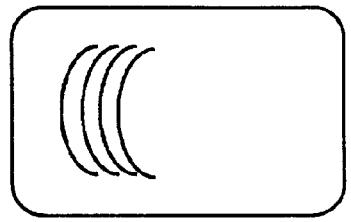
Figure 2J:
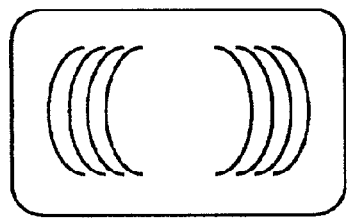
Figure 2K:
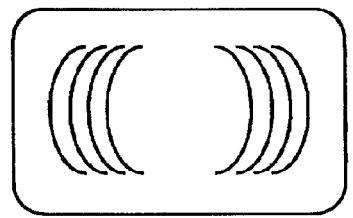
Figure 2L:
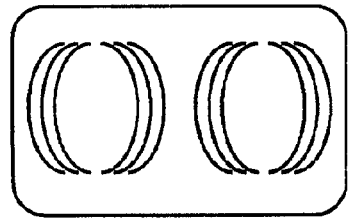
Figure 2M:
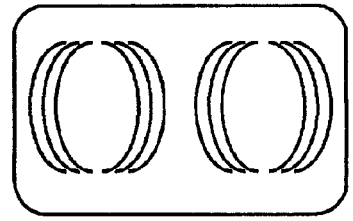
Figure 2N:
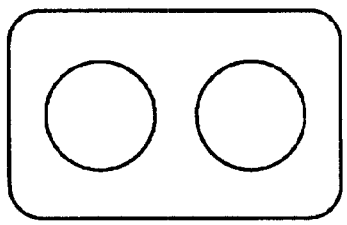
Figure 2O:
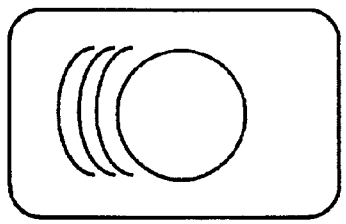
Figure 2P:
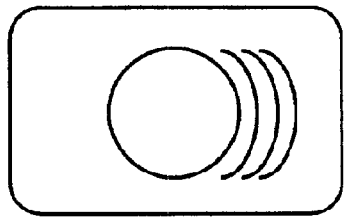
Figure 2Q:
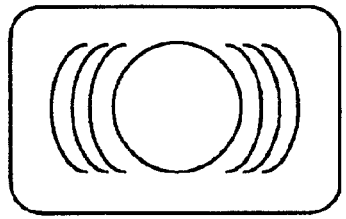

FIGS. 2D to 2Q are top views of the data storage card 180 for showing different configuration of the data tracks 270. The data tracks 270-1 can be parallel arcs facing opposite directions on either side of the data card 180 as shown in FIG. 2D. Alternately, each of the data tracks 270-1 as parallel arc as that shown in FIG. 2D can be partitioned into a plurality of arc-segment 270-2 as that shown in FIG. 2E. In a similar manner, the data tracks can be parallel arcs 270-3 formed over the entire data card area as that shown in FIG. 2F. Furthermore, each of the parallel arcs 270-3 of FIG. 2F can also be partitioned into a plurality of arc segments 270-4 as that shown in FIG. 2G.

According to FIGS. 1 to 2, this invention discloses a magnetic or optical data-storage card. The magnetic or optical data-storage card includes a magnetic or optical data-storage medium layer supported on the card. The data-storage medium layer includes a plurality of data storage tracks for storing data therein. Each of the tracks comprising at least an arc-segment wherein each of the data storage track being substantially parallel to a neighboring track. In a preferred embodiment, each of the arc-segments are substantially of a same segment length. In a preferred embodiment, the data-storage tracks further storing servo control data. In a preferred embodiment, the data-storage tracks further storing the servo-control data at a substantially same relative position on the data-storage tracks. In another preferred embodiment, the data-storage tracks further storing the servo-control data near edges of the data-storage card on the data-storage tracks. In another preferred embodiment, each of the data-storage tracks is substantially a semicircular arc-segment. In another preferred embodiment, each of the data-storage tracks includes several arc segments. In another preferred embodiment, the magnetic or optical data-storage card further includes self-positioning guiding means for guiding the card to a loading position when inserted into a data card drive device. In another preferred embodiment, the magnetic or optical data storage card having a first side and a second side and the data-storage tracks are disposed on the first and second sides. In another preferred embodiment, the magnetic or optical data storage further includes a card jacket for storing the data storage card.

Furthermore, this invention provides a new method for storing data in a magnetic or optical data-storage card. The method includes the steps of a) providing a magnetic or optical data-storage medium layer supported on the data-storage card. And, b) forming in the data-storage medium layer a plurality of data storage tracks for storing data therein by forming each of the tracks to include at least an arc-segment and each of the data storage tracks substantially parallel to a neighboring track. In a preferred embodiment, the step of forming the data-storage tracks as arc segments is a step of forming each of the arc segments substantially of a same segment length. In another preferred embodiment, the method further includes a step of storing servo control data in the data-storage tracks. In another preferred embodiment, the step of storing the servo-control data is a step of storing the servo-control data at a substantially same relative position on the data-storage tracks. In another preferred embodiment, the step of storing the servo-control data is a step of storing the servo-control data near edges of the data-storage card on the data-storage tracks. In another preferred embodiment, the step of forming the data-storage to include at least an arc segment is a step of forming each of the data-storage tracks substantially as a semicircular arc-segment. In another preferred embodiment, the step of forming the data-storage to include at least an arc segment is a step of forming each of the data-storage tracks to include several arc segments. In another preferred embodiment, the method further includes a step of providing a self-positioning guiding means for guiding the magnetic or optical data-storage card to a loading position when inserted into a data card drive device. In another preferred embodiment, the step of providing a magnetic or optical data-storage medium layer supported on the card is a step of providing the magnetic or optical data storage card to include a first side and a second side. And, the step of forming in the data-storage medium layer a plurality of data storage tracks is a step of forming the data-storage tracks on the first and second sides. In another preferred embodiment, the method further includes a step of providing a card jacket for storing the data storage card.

Figure 3A:
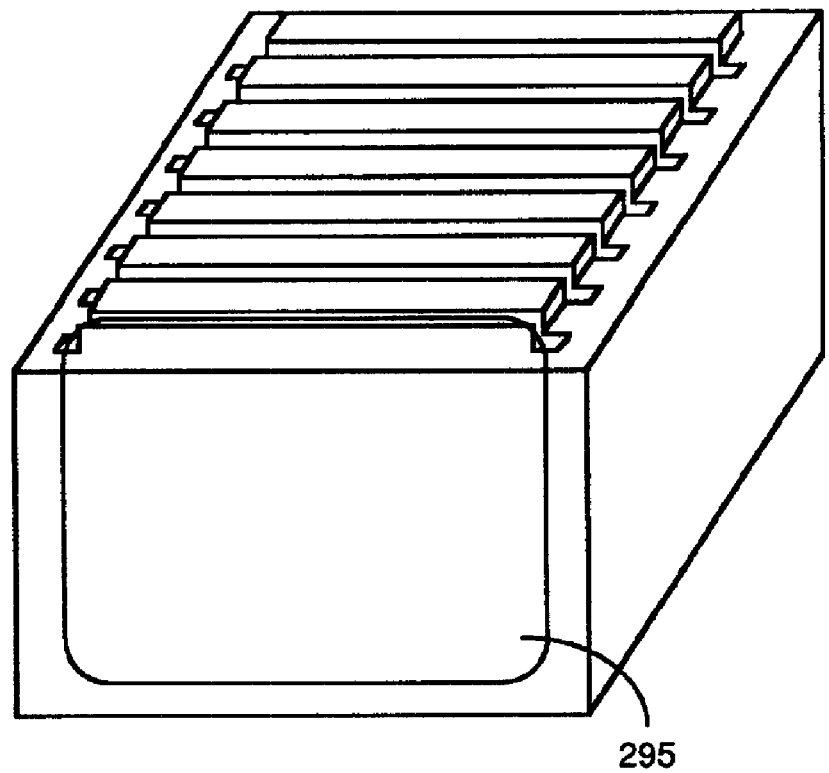
FIGS. 3A and 3B are a perspective view and a cross sectional view respectively of a data card storage box.
Figure 3B:
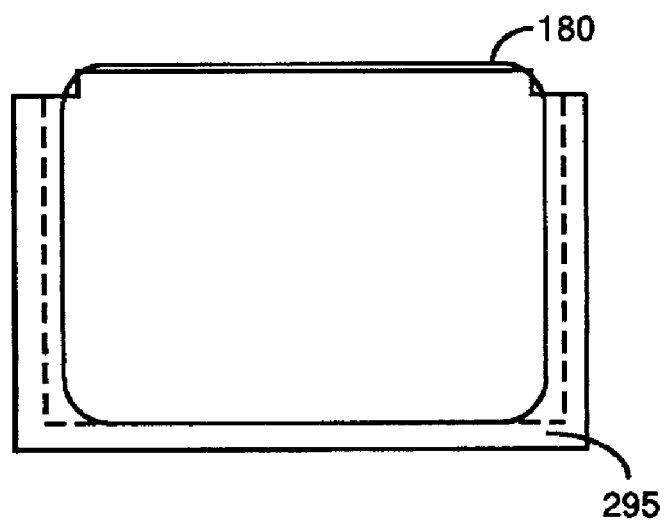

FIGS. 3A and 3B are a perspective view and a side view of a data card storage rack 295 for storing a plurality of data card 180 therein. The data card storage rack 295 as shown can be formed as partitioned storage box with each compartment ready to receive one data card 180. The data card storage rack 295 can function as a portable digital camera album or a backup data store for long term data storage.

Figure 4:
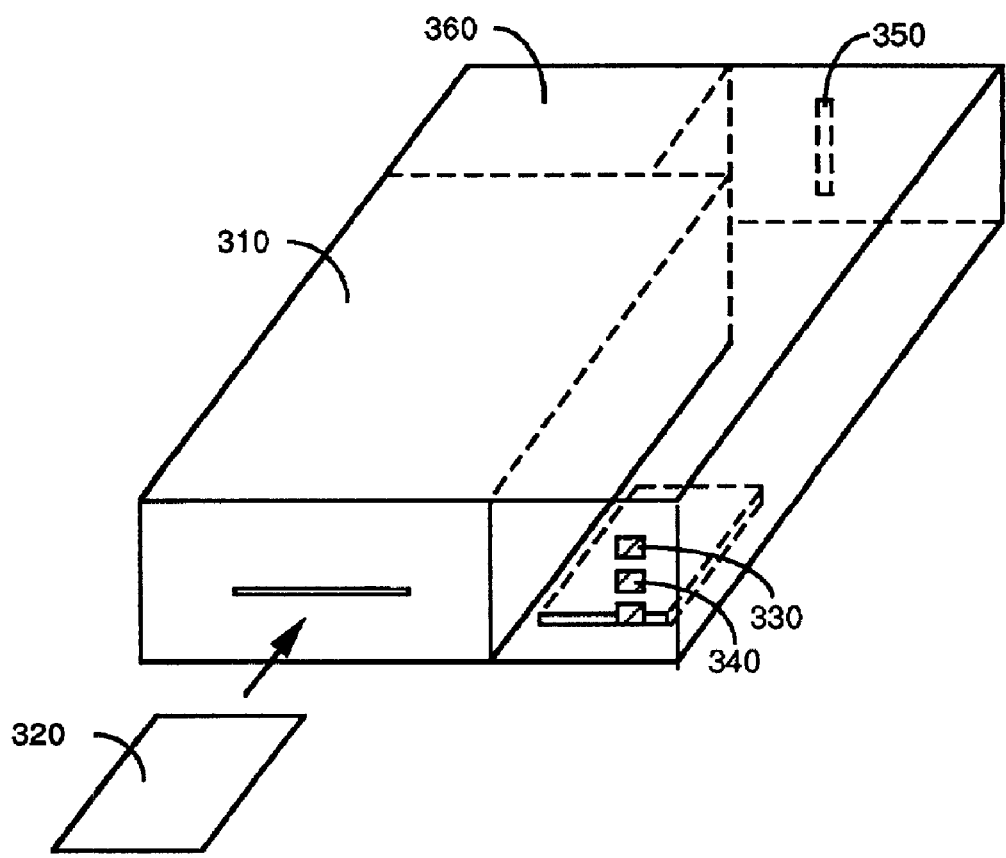
FIG. 4 is a functional block diagram of a subsystem of this invention includes a data card drive device of FIGS. 1A to 1C for reading/writing data storage card of FIGS. 2A to 2C.

FIG. 4 shows a subsystem 300 of this invention that includes a data card drive device 310 identical with the drive device 100 described above according to FIGS. 1A to 1C. The disk drive device 310 performs the data access tasks on a data storage card 320 identical to the data card 180 described above according to FIGS. 2A to 2C. The subsystem 300 further includes a local memory 330, which can be a DRAM or SRAM memory device connected to the disk drive device 310. The data stored in data card 320 can be first down loaded to the memory device 330 through a data bus for data storage. The subsystem 300 further includes a function control panel 340 to allow a user to control the subsystem startup, shutdown, save, update, and duplication of the data stored in the card. The subsystem 300 is further provided with a connection terminal 350 for connection to a personal computer, a printer, a scanner or other peripheral devices for operation together with the drive device subsystem 300. A power supply 360 is employed and connected to the subsystem 300 to provide power necessary for operating the drive device 310, the memory 340 and the control panel 330.

Figure 5A:
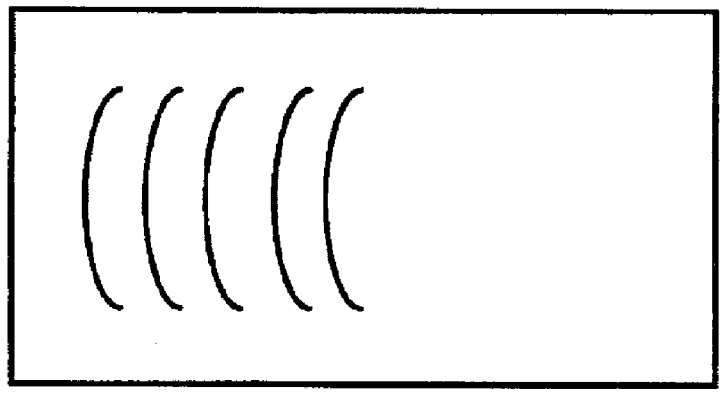
FIGS. 5A and 5B show the data tracks on a magnetic or optical data card with data tracks for writing servo data thereon.
Figure 5B:
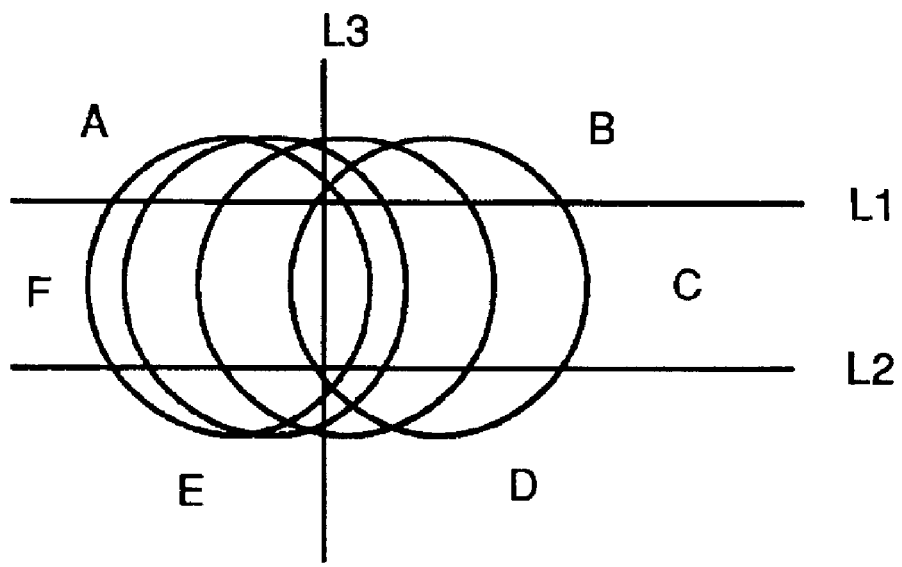
Figures 5C, 5D:
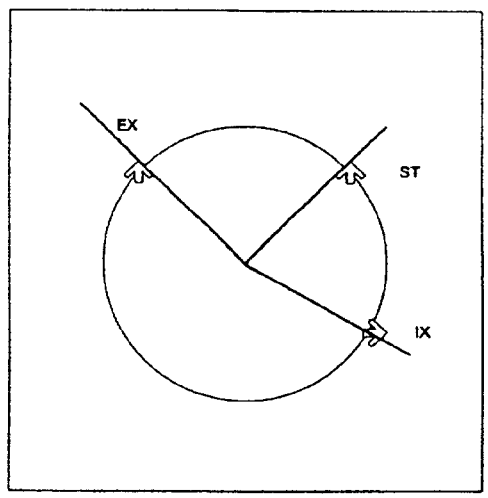
FIG. 5C shows an exemplary pattern of servo data written onto a data track.
FIG. 5D shows the position indexes for servo control.

Referring to FIGS. 5A to 5C for examples to illustrate the servo signal patterns written onto the arc segments of the data-storage tracks on a data storage card. FIG. 5A shows the data storage tracks as arc segments, which may or may not be circular arcs. The servo writer must write servo signals on these data-tracks. Referring to FIG. 5B, the surface area of the magnetic or optical data-storage card is divided into zones A to F according to clockwise direction. The servo writer should be disabled for Zones A, B, D, and E since these zones are not part of the data tracks. The servo writer must also be disabled in zone E because the servo data may be overlapped and create confusions in the process of pickup head location and track determinations. It is obvious the conventional servo writer and control mechanisms can no longer be employed for the magnetic or optical data card drive system of this invention.

As shown in FIG. 5A, the length of the data tracks depends on the size and dimensions of the data card. Each data track is divided into N segments and each segment is provided to contain pre-defined servo data, prerecorded data and/or definitions of area for data records. FIG. 5C is an example of the data arrangements across the tracks of such segment. The total number of data tracks N is determined by the requirements of the accuracy of the mechanical and electrical responses. The servo data shown in FIG. 5C can provide the track profile, the location of the track and the relative location of signal pickup head to a data track along a track.

Referring to the details of data arrangement shown in FIG. 5C, the signals generated from data bit-patterns A and B are for position determination. Each data track has a half data slots provided for A and half of the slots provided for B. The balance of A and B detected by the pickup head and the track location determination circuits provide indications that the pickup head is traveling in the center of the data track. Table 1 shows the data sample employed for providing servo data for track and location determinations as the pickup head is traveling over the surface of the magnetic or optical data storage card.

TABLE 1

Example of Partial Servo Segment Data

| | |
|---|---|
| SYNC | 1010101010101010 |
| ADM | 1000000010000001 |
| ST IDX | 11 for First Segment 00 for other segments |
| ED IDX | 11 for last segment 00 for other segments |
| A | 0000001100000000 |
| B | 0000000000000011 |

Figure 5E:
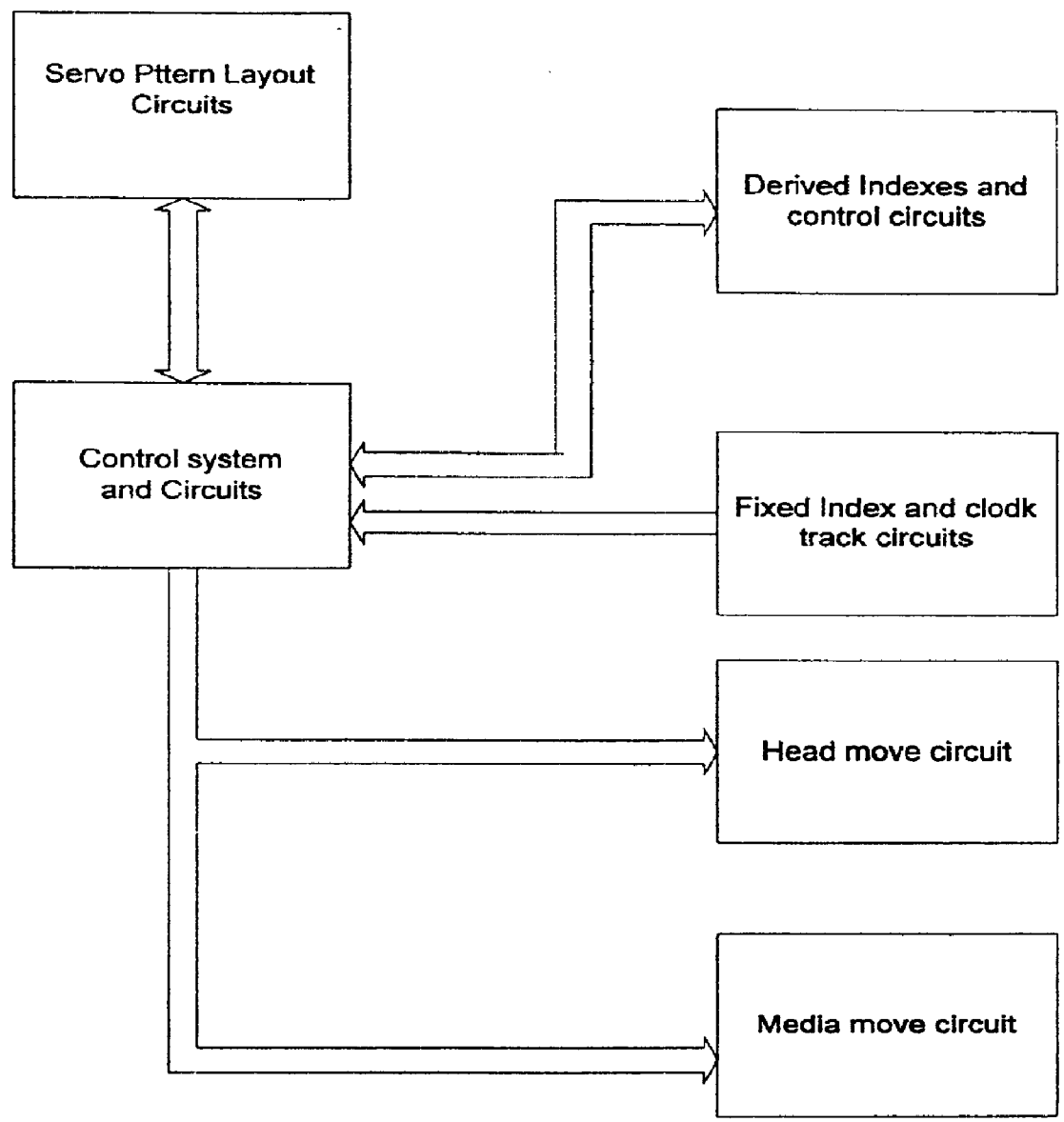
FIG. 5E is a functional block diagram to illustrate the control logic implementation of a servo writer of this invention.

Referring to FIG. 5D, since the data track can only be arc-segments as that shown FIG. 5A, the servo writer must start and stop to layout patterns at pre-determined locations. An index is used as a reference point at a fixed location on the magnetic or optical data-storage card. The starting point SX and the stopping position EX of the servo data are derived from the reference point IX as shown in FIG. 5D. A servo control circuit is employed to enable and disable the pattern layout process and to move the magnetic or optical pickup head and the flat data-storage medium, i.e., the magnetic or optical data storage card by using the feedback by detecting these three indices. An exemplary functional block diagram for implementing the control logic in the servo control circuit is shown in FIG. 5E.

Figure 6:
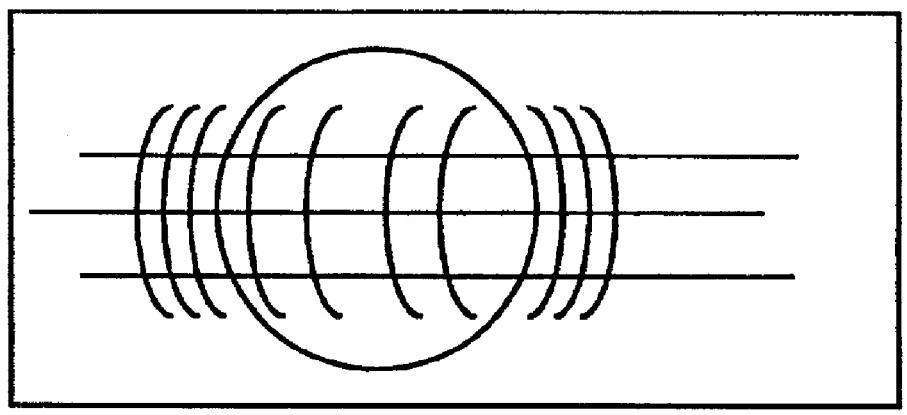
FIG. 6 the top views of the data storage card of this invention where one of the data tracks is arranged as a full circle data track among a group of data arcs for centering the data card and data signal calibration.

Referring to FIG. 6 for a top view of the data storage card of this invention where one of the data tracks is arranged as a full circle data track for centering the data card and data signal calibration. As the pickup head moved above the data card to read the data from the full circle data track, an X-Y table that moves along horizontal directions is controlled to position the data card at a center position relative the circular movement of the pickup head. In the meantime, the data bits stored in the full circle data-track are read to determine an average amplitude of the data signals for data read from the entire full circle data track. The average amplitude of the data signal is then applied to calibrate the data detection sensitivity of the pickup head.

Figure 7A:
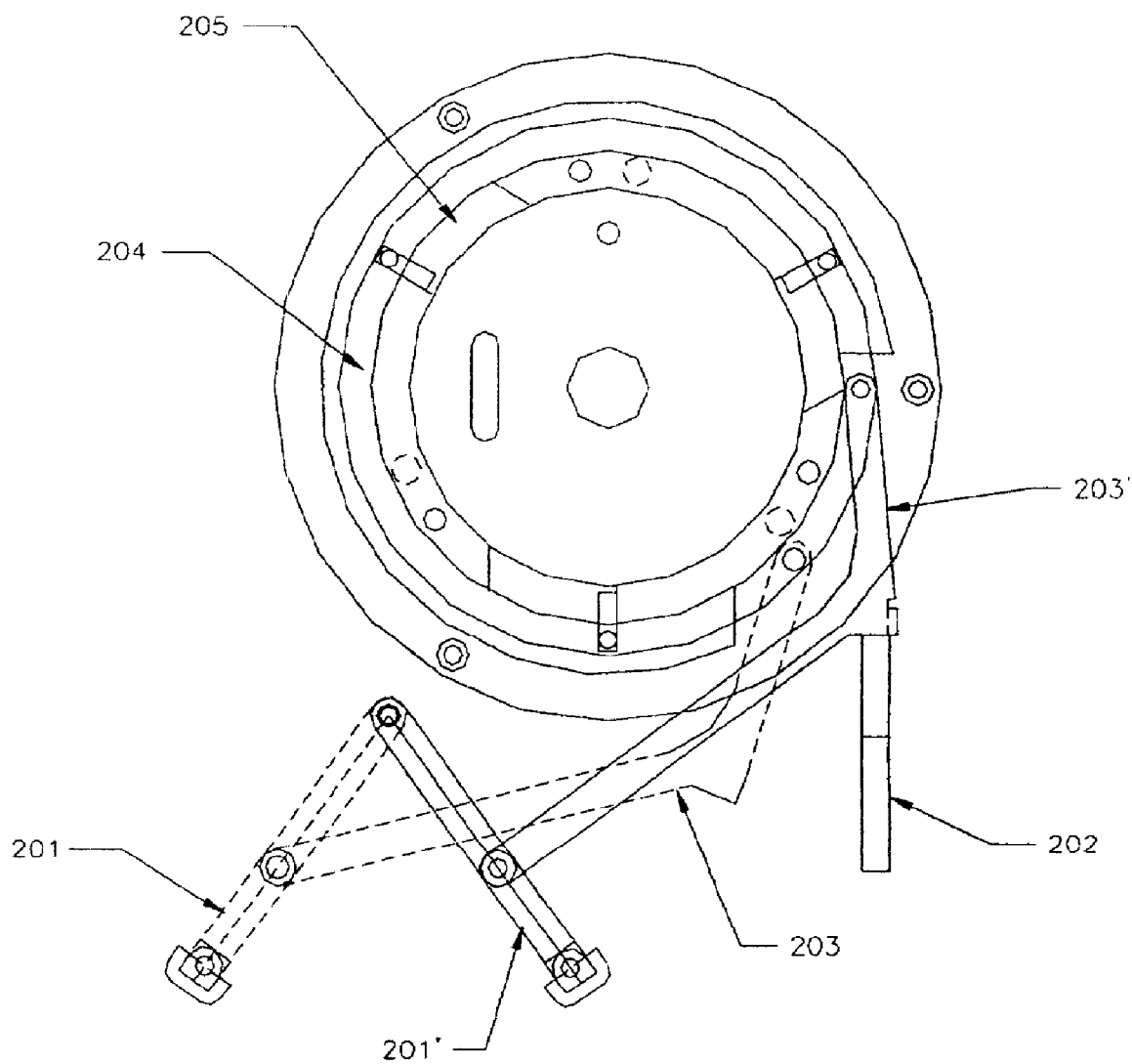
FIGS. 7A and 7B are a top and side cross sectional views of a locking mechanism for locking a handle to prevent movement of a data card when the pickup head is moving and the handle also activates a cam mechanism to engage/disengage the signal pickup head to and from the data card.
Figure 7B:
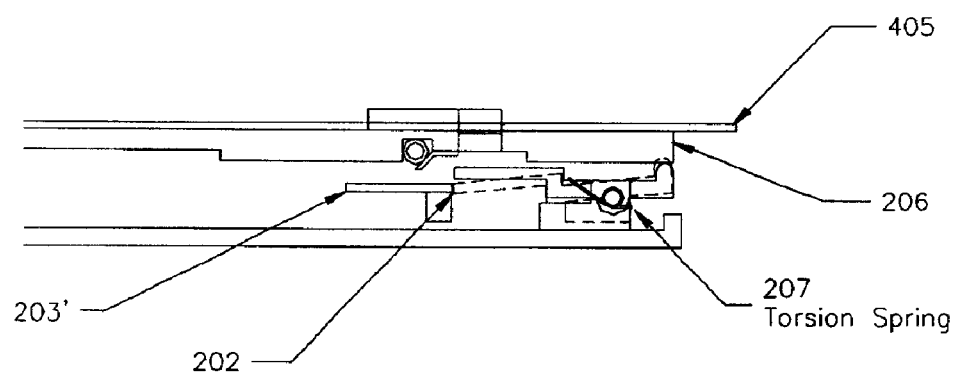

FIG. 7A shows a top view of a locking mechanism for a pickup head engagement configuration. The handle 201 can be moved by either manually or a solenoid to push a linkage 203 shown in dotted lines to activate the pickup head loading and unloading cam pair 204 and 205. The positions of the handle 201' and the linkage 203' in solid lines show an activated state position. FIG. 7B shows a side view of lock 202 and stopper 206 that is part of X Y table slides. Once the linkage 203' is at the activated position and the stopper 206 of the X-Y slider is moved away from the lock 202, a spring 207 pushes the end of the lock 202 up. The other end of the lock 202 drops down and the linkage 203' is prevented from a motion of sliding back. The linkage 203' is released when the stopper 206 moves back to press down the spring end of the lock 202 thus releasing the linkage 203' from a locked position. The linkage 203' stays in a locked position to engage the pickup head until it is released and pushed back to a disengaged position 203.

Figure 8A:
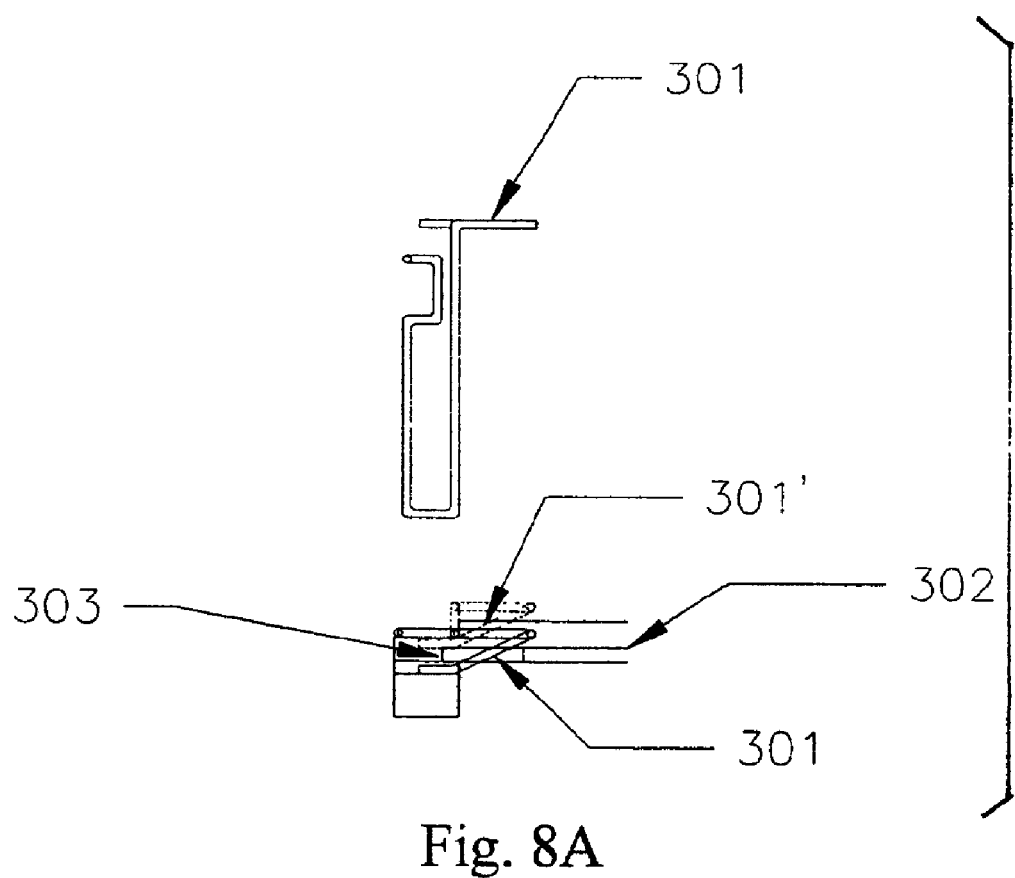
FIG. 8A is a side cross sectional view of a spring lock to prevent the insertion of card in wrong direction.
Figure 8B:
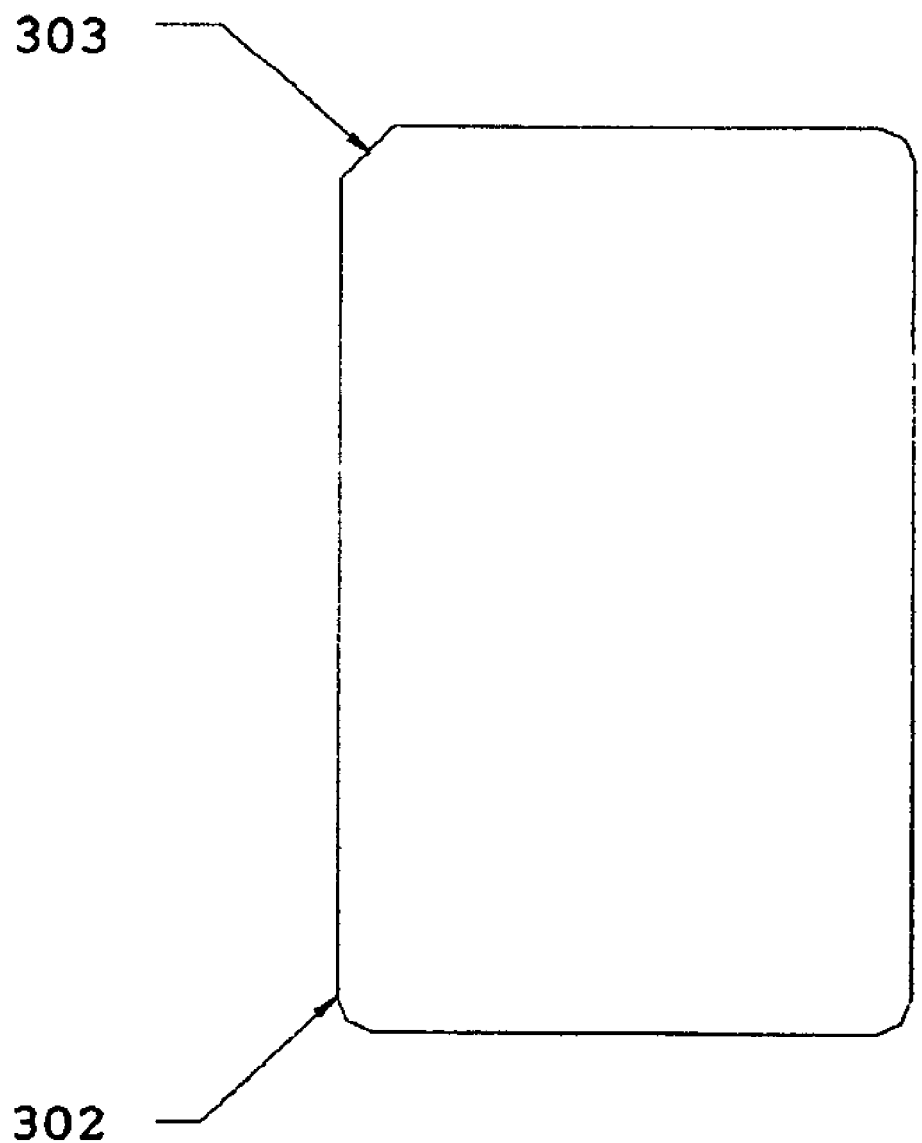
FIG. 8B is a top view of a card with a cutoff corner to operate with the spring lock of FIG. 8A for inserting into the card reader when the card with the cutoff corner is correctly inserted.

FIG. 8 is a cross section view of a card insertion lock spring 301 and card 302 with one corner cut 303. FIG. 8A shows top view of a card 302 with its one corner diagonal cut 303. When the card 302 is inserted to the device, the corner 303 pushed the spring 301 up to 301' position and the card can be inserted continuously to its final location. It the wrong side of the card is inserted that has no such corner cut, the card edge can not push the 301 upwards and the spring 301 prevents the continue insertion of card. This cutoff corner 303 of the data card 302 prevents the insertion of card 302 with wrong edge in or an upside down side direction.

Figure 9A:
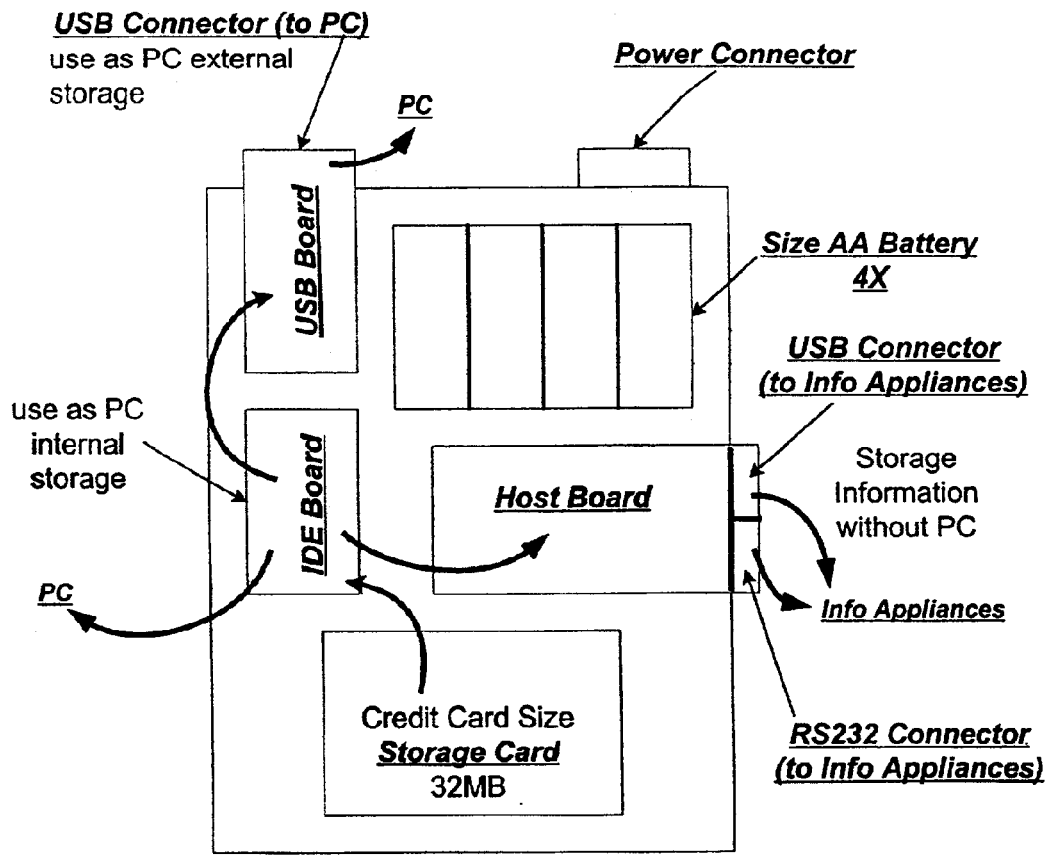
FIG. 9A is a functional block diagram of a card reader/writer system of this invention.
Figure 9B:
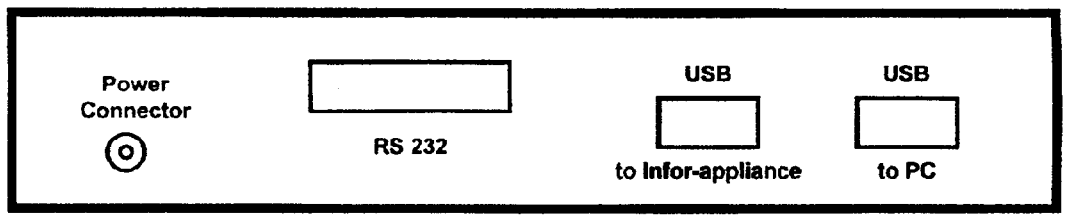
FIG. 9B shows the back side panel of a care reader/writer provided with different interfaces for parallel, serial and universal system (USB) connection.

FIG. 9A is functional block diagram of a data card reader/writer of this invention. The data card reader/writer includes a host board provided with a reader/writer processor to control the operation and data transfer functions. Attached to the host board are an USB connector and an RS232 serial connector to connect to various information appliances such as digital video camera, music player, etc. The data card reader/writer further includes an IDE board and a USB board to provide an IDE interface and a USB interface to operate with a personal computer (PC). The data card reader/writer has an option to operate with batteries or AC power through a connection of a power connector. FIG. 9B is a side view of a back panel for the data card reader/writer that includes a power connector to plug into an AC power. The data card reader/writer further includes RS232 and two USB connectors for connecting to information appliances and personal computer.

According to above descriptions, this invention discloses a flat data storage medium that includes a plurality of substantially parallel data arc-segments. The data arcs further include at least one full circle data track provided for obtaining a measurement of an average amplitude of data signals over the full circle data track for calibrating a pickup head implemented for reading data from the data arc-segments. This invention further discloses a data storage system for accessing data stored in a data storage medium. The data storage system includes dynamic head loading/unloading system that includes a handle for pushing a linkage connected to the handle for loading and unloading the data storage medium to an engaged and disengaged positions relative to a pickup head for accessing data disposed on the data storage medium. The dynamic head loading/unloading system further includes a locking means for automatically locking the data storage medium inside the data storage system when the linkage is disposed at an engaged position. The dynamic head loading/unloading system further includes a data-storage medium orientation-selection means for cooperating and adapting the data storage medium inside the data storage system only when the data storage medium is inserted into the data storage system in a predefined orientation.

Therefore, the present invention discloses a data storage-card drive system with a pickup head moving above the data-storage card in rotational movement. The data read-write functions are enabled only for arc-segments of the rotational movement guided by servo data written to servo sectors on the data arc with proper offsets. Also, the data tracks are arranged as plurality of parallel arcs, e.g., half-circles. At least one special full circle data track is provided for conveniently determining a central axis of the data card and for obtaining a measurement of average amplitude such that the above mentioned difficulties and limitations encountered in a regular data card can be overcome. Specifically, a pickup head driven by a motor, e.g., a brushless motor, rotates over the data-storage card with the rotation axis perpendicular to the card surface. The motor is mounted on a carriage for making horizontal movement along a longitudinal direction of the data card. An X-Y table is provided to move and position the card on the center relative to the rotation of the pickup head. The data card is formed with at least one full circle data track for conveniently centering the data card. The full circle data track is formed with data for the pickup head to obtain an average signal amplitude for calibrating the amplitude of the data signal read from the data card.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A flat data storage medium comprising:
  a plurality of substantially parallel data arc segments together with at least one full circle data track disposed on said flat data storage medium wherein said full circle data track provided with data for conveniently determining a central position of the flat data storage medium in a data drive system to conveniently read data from said plurality of parallel data arc segments.

2. A flat data storage medium comprising:
  a plurality of substantially parallel data arc segments together with at least one full circle data track disposed on said flat data storage medium wherein said full circle data track provided for obtaining a measurement of an average amplitude of data signals over said full circle data track for calibrating a pickup head implemented for reading data from said plurality of parallel data arc-segments.

3. A method for configuring a flat data storage medium comprising:
  forming a plurality of substantially parallel data arc segments together with at least one full circle data track on said flat storage medium wherein said full circle data track provided with data for conveniently determining a central position of said flat data storage medium in a data drive system to conveniently read data from said plurality of parallel data arc segments.

4. A method for configuring a flat data storage medium comprising:
  forming a plurality of substantially parallel data arc segments together with at least one full circle data track on said flat storage medium wherein said full circle data track provided with data for obtaining a measurement of an average amplitude of data signals over said full circle data track for calibrating a pickup head implemented for reading data from said plurality of parallel data arc-segments.

5. A magnetic data-card drive system comprising:
  a magnetic data access means consisting of only a single magnetic pickup head for rotationally moving over and accessing data stored in a plurality of data arc segments;
  an X-Y table for engaging and moving said data-card according to servo-control data stored an said data arc segments as processed by said single magnetic pickup head; and
  said single magnetic pickup head is provided for accessing data recorded in said plurality of data arc segments and a full circle data track disposed on said magnetic data card wherein said full circle data track is provided for conveniently determining a central position of said data card in said magnetic data-card drive system to conveniently read data from said plurality of parallel data arc segments.

6. The magnetic data-card drive system of claim 5 wherein:
said single magnetic pickup head further comprising an extended head arm; and
said drive system further includes a loading/unloading arm for pressing onto the extended head arm in an unloading mode and removed from said extended head arm in a loading mode for dynamically controlling an loading/unloading of said single magnetic pickup head to and from said magnetic data card.

7. The magnetic data-card drive system of claim 5 wherein:
said single magnetic pickup head is provided for accessing data over several of said arc-segments and said full circle data track during said rotational movement.

8. The magnetic data-card drive system of claim 5 wherein:
said single magnetic pickup head is provided for rotating in a single rotational direction for accessing data stored in said plurality of data arc segments and said full circle data track on said magnetic data card.

9. The magnetic data-card drive system of claim 5 wherein:
said single magnetic pickup head is provided for rotating in clockwise and counterclockwise directions for accessing data stored in said plurality of data arc segments and said full circle data track on said magnetic data card.

10. The magnetic data-card drive system of claim 5 wherein:
said single magnetic pickup head is provided for rotating over and accessing data stored in said data arc segments and said full circle data track having a radius smaller than half-width of said magnetic data card.

11. The magnetic data-card drive system of claim 5 wherein:
said single magnetic pickup head is provided for rotating over and accessing data stored in said data arc segments having a radius greater than half-width of said magnetic data card and said full circle data track having a radius smaller than half-width of said magnetic data card.

12. The magnetic data-card drive system of claim 5 wherein:
said magnetic data accessing means includes said single magnetic pickup head is provided as a removable and replaceable module.

13. The magnetic data-card drive system of claim 5 wherein:
said single magnetic pickup head is provided for accessing data by contacting and sensing data stored in said data arc segments and said full circle data track disposed on said magnetic data card.

14. The magnetic data-card drive system of claim 5 wherein:
said single magnetic pickup head is provided for accessing data by rotating at a distance above and sensing data stored in said data arc segments and said full circle data track disposed on said magnetic data card.

15. The magnetic data-card drive system of claim 5 further comprising:
a motor for driving a rotating shaft for mounting and rotating said single magnetic pickup head.

16. The magnetic data-card drive system of claim 5 wherein:
said single magnetic pickup head further includes a data signal transformer for transforming signals through induced changes of magnetic flux representing data stored in said data arc segments and said full circle data track disposed on said data card.

17. The magnetic data-card drive system of claim 16 wherein:
said data signal transformer further includes a pickup transformer core rotating with and connected to said single magnetic pickup head;
said data signal transformer further includes a receiver transformer core disposed near said pickup transformer core for receiving said signal generated by induced changes of magnetic flux in said data card and wherein said receiver transformer core is mechanically decoupled from said pickup transformer core; and
said data signal transformer further includes a magnetic shield for shielding a magnetic field of said data signal transformer from interfering with said single magnetic pickup head.

18. The magnetic data-card drive system of claim 5 further includes:
a second data accessing means includes a second single magnetic pickup head disposed opposite said data accessing means for rotationally moving over and accessing data stored on a second surface of said magnetic data-card.

19. The magnetic data-card drive system of claim 5 wherein:
said X-Y table further comprising a stepping motor for moving said magnetic data-card with said servo-control data provided both from said data arc segments and said full-circle data track.

20. The magnetic data-card drive system of claim 5 further includes:
a linear movement means for engaging and linearly moving said single pickup head with said servo-control data provided both from said data arc segments and said full-circle data track.

21. The magnetic data-card drive system of claim 5 wherein:
said X-Y table further includes and driven by a voice coil motor based on said servo-control data provided both from said data arc segments and said full-circle data track.

22. The magnetic data-card drive system of claim 21 wherein:
said linear movement means further comprising a stepping motor for linearly moving said single magnetic pickup head.

23. The magnetic data-card drive system of claim 22 wherein:
said stepping motor further includes a step motor engaged to a lead screw.

24. The magnetic data-card drive system of claim 22 wherein:
said stepping motor further includes and engaged to a band actuator.

25. The magnetic data-card drive system of claim 22 wherein:
said stepping motor further includes and engaged to a rack-pinion.

26. The magnetic data-card drive system of claim 5 wherein:
said X-Y table further includes and driven by a direct current (DC) motor based on said servo-control data provided both from said data arc segments and said full-circle data track.

27. The magnetic data-card drive system of claim 5 wherein:

said X-Y table further includes and driven by an alternating current (AC) motor based on said servo-control data provided both from said data arc segments and said full-circle data track.

28. The magnetic data-card drive system of claim 5 wherein:

said single magnetic pickup head further includes a magnetic-detecting means for detecting a magnetic signal stored in said plurality of data arc segments and said full circle data track disposed on said data-card and converting said magnetic signal into an electrical signal.

29. The magnetic data-card drive system of claim 5 wherein:

said single magnetic pickup head further includes a magnetic writing means for writing a magnetic data onto said plurality of data arc segments and said full circle data track disposed on said data-card.

* * * * *